United States Patent
Mills (10) Patent No.: US 6,907,666 B2
(45) Date of Patent: Jun. 21, 2005

(54) METHOD OF ASSEMBLY OF VEHICLE BODY STRUCTURE

(75) Inventor: Richard David Mills, Rome, GA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 169 days.

(21) Appl. No.: 10/327,816

(22) Filed: Dec. 24, 2002

(65) Prior Publication Data

US 2004/0117965 A1 Jun. 24, 2004

(51) Int. Cl.⁷ ............................................ B62D 65/00
(52) U.S. Cl. ................. 29/897.2; 29/521; 29/557; 29/430; 228/164; 228/170; 228/182; 296/101
(58) Field of Search ................... 29/897.2, 412, 29/417, 430, 462, 521, 557, 783, 791, 787, 795; 228/4.1, 5.1, 6.1, 13, 15.1, 164, 170, 182; 403/263, 230; 296/101

(56) References Cited

U.S. PATENT DOCUMENTS

| | | | | |
|---|---|---|---|---|
| 2,996,790 | A | * 8/1961 | Trafford | ................... 29/600 |
| 4,365,736 | A | * 12/1982 | Stumm | ................. 228/121 |
| 4,513,064 | A | * 4/1985 | Marcus | ................. 428/582 |
| 4,548,132 | A | 10/1985 | Moon | |
| 5,190,207 | A | 3/1993 | Peck et al. | |
| 5,221,585 | A | * 6/1993 | Kresse et al. | ............. 428/573 |
| 5,532,451 | A | * 7/1996 | La Rocca | ............ 219/121.64 |
| 5,588,693 | A | 12/1996 | Higginson et al. | |
| 5,878,940 | A | 3/1999 | Rosenbalm | |
| 6,034,347 | A | * 3/2000 | Alber et al. | ........... 219/121.64 |
| 6,128,815 | A | 10/2000 | Jurica et al. | |
| 6,131,286 | A | * 10/2000 | Kelly et al. | ............... 29/897.2 |
| 6,276,592 | B1 | * 8/2001 | Jochmann et al. | .......... 228/121 |
| 6,301,763 | B1 | 10/2001 | Pryor | |
| 6,327,514 | B1 | 12/2001 | Hazama et al. | |
| 6,394,007 | B2 | * 5/2002 | Lewis et al. | .............. 109/59 R |
| 6,643,908 | B1 | * 11/2003 | Lyons | ........................ 29/445 |
| 2001/0016805 | A1 | 8/2001 | Gupta et al. | |
| 2001/0043834 | A1 | 11/2001 | Mullen | |

FOREIGN PATENT DOCUMENTS

| | | |
|---|---|---|
| JP | 53007035 A | 1/1978 |
| JP | 1204870 | 8/1989 |

* cited by examiner

*Primary Examiner*—Jermie E. Cozart
(74) *Attorney, Agent, or Firm*—Chambliss, Bahner & Stophel, P.C.

(57) ABSTRACT

A method of manufacture of a body assembly of a refuse vehicle includes forming a first, second and third components of the assembly. A first and second locating constructions are formed in the first component. The second component is formed so as to have a first mating structure which is adapted to mate with the first locating construction in the first component so as to uniquely locate the second component with respect to the first component. The third component is formed so as to have a second mating structure which is adapted to mate with the second locating construction in the first component so as to uniquely locate the third component with respect to the first component. The second component is located with respect to the first component by mating the first mating structure on the second component with the first locating construction in the first component, and the third component is located with respect to the first component by mating the second mating structure on the third component with the second locating construction in the first component. The second component and the third component are welded to the first component.

13 Claims, 8 Drawing Sheets

METHOD OF ASSEMBLY OF VEHICLE BODY STRUCTURE

FIELD OF THE INVENTION

This invention relates generally to the fabrication and assembly of vehicle body structures. More particularly, the invention relates to a method that includes forming structural components and properly locating such components with respect to each other in the assembly process.

BACKGROUND AND DESCRIPTION OF THE PRIOR ART

The conventional process for manufacture and assembly of a vehicle body structure includes both a fabrication phase and an assembly phase. In the fabrication phase, various sheet metal components are cut from sheets of metal, and they may be bent or otherwise fabricated into particular shapes or configuration. In the assembly phase, these components are located and fixed with respect to each other and welded or otherwise joined to form the vehicle body structure. The techniques conventionally employed in the assembly phase rely heavily on a vast array of fixtures that are used to locate the individual components prior to being welded. These fixtures range in complexity from small tabletop welding jigs with simple locators to very complex electronically controlled motor driven units capable of holding large assemblies or subassemblies in place for welding. These fixtures cost many thousands of dollars to design and manufacture and also require ongoing maintenance to insure that they remain accurate and consistent with product improvement and other design changes. In addition, the locating of components with respect to each other by fixturing often results in errors in fit and weld integrity between the components. When fixturing is used to locate components with respect to each other, most of the welds required for the assembly of a vehicle body structure must be made by human rather than robot welders. Furthermore, in an attempt to correct errors in fit between the components, large welds are often made to fill in the gaps between components. Such large welds may contribute increased weight and may cause heat distortion in the finished product. In addition, the fixtures for a new product require time to design and build. When a new prototype for a product is to be made, it is often necessary to build the fixtures for the design by hand. This process is slow, labor-intensive and expensive.

In recent years, there have been a number of developments aimed at improving the conventional manufacturing process. For example, flexible manufacturing systems and modular fixturing systems have been developed to handle an increase in product variations, especially as relates to custom fabricated products or the production of several products on a single production line. However, these systems have not attempted to reduce the extent to which fixturing is required in the manufacture of vehicle body systems.

It would be desirable if a manufacturing method for a vehicle body structure could be devised that would reduce or minimize the number and complexity of the fixtures required for assembly. It would also be desirable if such a method could be devised that would reduce or minimize the risk of human error in the assembly process. It would also be desirable if such a method could be provided that would provide for more accurate fit of the various components, thus reducing the size of the welds required and reducing the effects of heat distortion due to such welds.

ADVANTAGES OF THE INVENTION

Among the advantages of the invention is that it permits the assembly of a body assembly of a refuse vehicle utilizing fewer and/or less complex fixtures than are required by conventional methods. Another advantage of the invention is that it provides for manufacture of a body assembly of a refuse vehicle more quickly and with more accurate fit than is obtained by conventional methods. Still another advantage of the invention is that it is susceptible to a larger number of welds being provided by robot welders than in conventional methods. Another advantage of the invention is that it may permit the fabrication phase of the manufacturing process to be physically separated from the assembly phase. Yet another advantage of the invention is that the components of a body assembly are formed in such a way as to guide the assemblers in the correct sequence of assembly. The components thus aid the assemblers in the assembly phase and reduce the need for complex assembly drawings and/or assembly tooling.

Additional advantages of this invention will become apparent from an examination of the drawings and the ensuing description.

EXPLANATION OF TECHNICAL TERMS

As used herein, the term "refuse vehicle" is a vehicle or item of mobile equipment that is used in the collection, transportation and/or compaction of refuse.

As used herein, the term "body assembly of a refuse vehicle" refers to an assembly or subassembly that is mounted on the chassis or on another body assembly of a refuse vehicle. Such assemblies include, but are not limited to, storage bodies and subassemblies thereof, hoppers and subassemblies thereof, tailgate assemblies and subassemblies, and compaction bodies and subassemblies thereof.

As used herein, the term "locating construction" refers to a slot, hole, tab or other feature of a component that may be used to position or locate a component with respect to another.

SUMMARY OF THE INVENTION

The invention comprises a method of manufacture of a body assembly of a refuse vehicle. According to this method, a first component for the vehicle body structure is formed, and first and second locating constructions are formed in the first component. The method also includes forming a second component having a first mating structure which is adapted to mate with the first locating construction in the first component so as to uniquely locate the second component with respect to the first component. The method also includes forming a third component having a second mating structure which is adapted to mate with the second locating construction in the first component so as to uniquely locate the third component with respect to the first component. The second component is located with respect to the first component by mating the first mating structure on the second component with the first locating construction in the first component, and the third component is located with respect to the first component by mating the second mating structure on the third component with the second locating construction in the first component. The second component and the third component are welded to the first component.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Refuse vehicles typically include a chassis having an engine and drive train, a cab or operator compartment at the forward end and one or more body assemblies mounted to the rear of the cab. Such body assemblies may include storage and compaction bodies for holding and compacting refuse, hoppers for receiving refuse and tailgate assemblies. The chassis may also have one or more lifting assemblies mounted thereon for grasping and lifting a refuse container so as to dump the contents of the container in the hopper.

Common designations for these vehicles may be defined by the location of the receiving hopper or by the location and operation of the lifting assembly or assemblies. Such designations include front loaders, side loaders and rear loaders. The storage body, compaction body or a tailgate assembly for the vehicle will most likely include a compaction and ejection device by which refuse may be compacted and then ejected from the body. Typical capacities for storage bodies range from approximately six cubic yards in volume to approximately forty cubic yards. Lengths usually range from six feet to thirty-five feet. Numerous shapes and types of bodies are common including those having circular and rectangular cross sections, and there are many variations among common body types. For example, generally rectangular bodies may have planar sides with either square, chamfered or rounded corners. In the alternative, a generally rectangular body may be fabricated of curved panels which join along either a straight or a curved line. Reinforcement members may be of various shapes and may be located in various places on the bodies. The contour and dimensions of the receiving hopper and tailgate assemblies are influenced by the corresponding contour and dimensions of the body component to which these assemblies are attached, as well as the specific configuration and location of any lifting, compacting and ejecting mechanisms incorporated therein.

In the manufacture and assembly of a refuse vehicle, it is common to obtain the chassis from one of various manufacturers, complete with its engine, drive train and cab or operator compartment. The various body assemblies are then fabricated and assembled and mounted to the chassis. The storage and compaction body assembly or assemblies are generally made with a constant cross-sectional shape or profile, and the hopper and tailgate assemblies are formed to mate with the storage and compaction body assembly or assemblies. The lifting assembly or assemblies are then mounted on the chassis or on one of the other assemblies to complete the assembly of the refuse vehicle.

Figure 1:
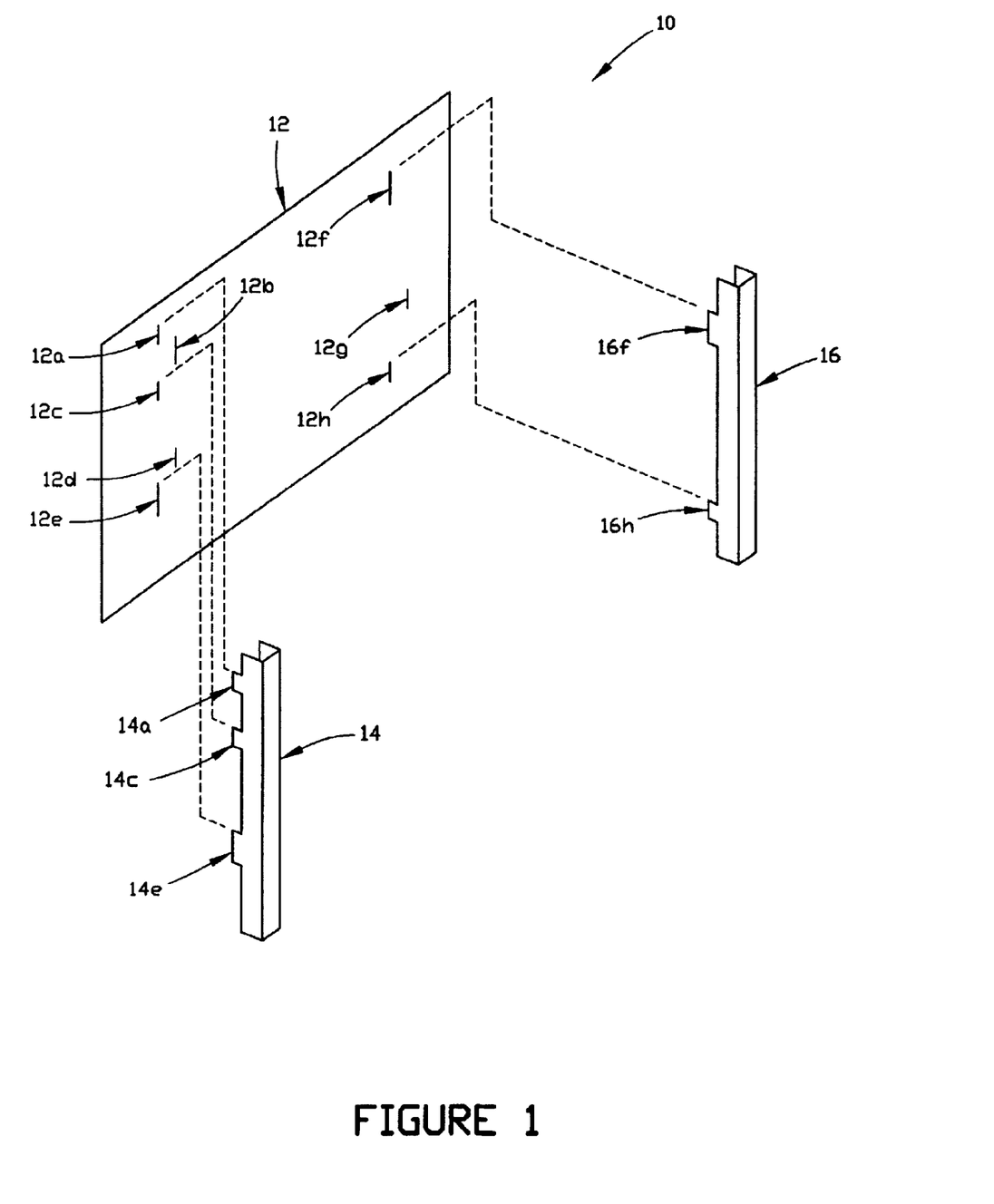
FIG. 1 is a perspective view of an exploded assembly of a portion of a hopper side panel of a rear loader type refuse vehicle.
Figure 6:
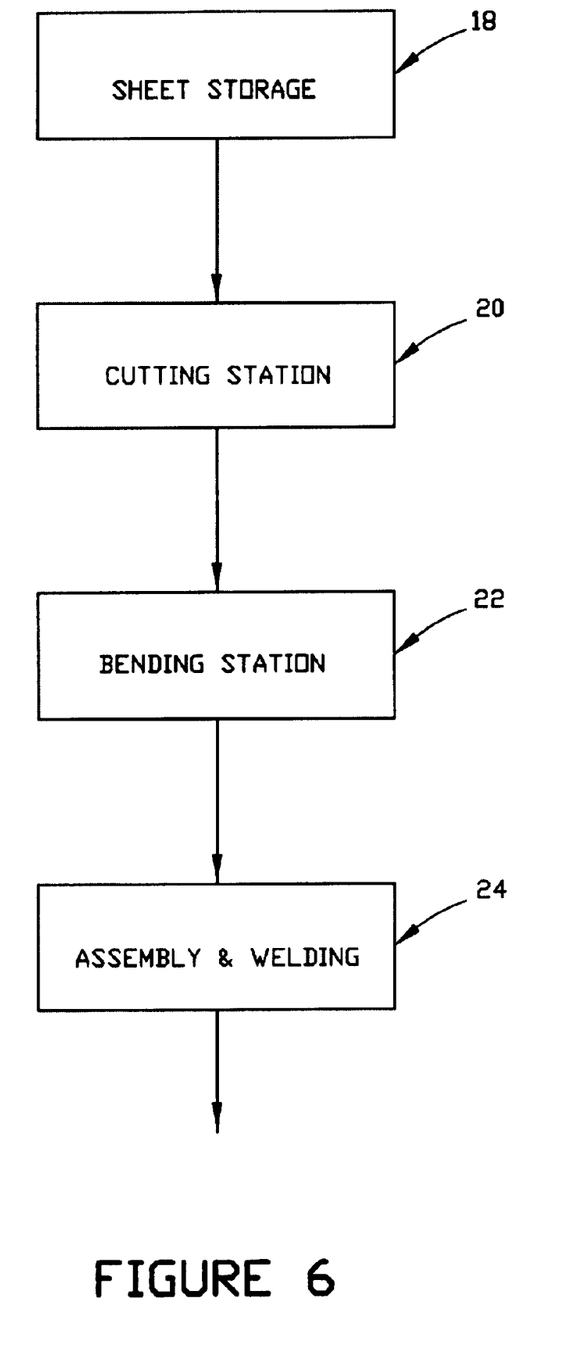
FIG. 6 is a schematic flow diagram illustrating the stations of a preferred physical plant layout for use in fabricating and assembling a body assembly such as that of FIGS. 1–5 according to a preferred embodiment of the invention.

FIGS. 1 through 5 illustrate the assembly of a portion of a hopper side panel of a rear loader refuse vehicle according to a preferred embodiment of the invention, and FIG. 6 illustrates the stations of a preferred physical plant layout for use in the fabrication and assembly of such a body assembly. As shown in FIG. 1, assembly 10 includes a first component comprising side plate 12, a second component comprising vertical support 14 and a third component comprising vertical support 16. In the practice of the invention to manufacture this body assembly, a first sheet of metal (not shown), preferably a rectangular, flat sheet of suitable thickness for the use intended, is selected from sheet storage facility 18 (FIG. 6) and conveyed, preferably by a mechanical conveyor (not shown), to cutting station 20. At the cutting station, side plate 12 is cut from the first sheet, preferably by means of a laser cutter (not shown) that is controlled by a computerized controller (also not shown). A first pattern of locating constructions for uniquely locating vertical support 14 with respect to side plate 12 is selected, and the first plurality of locating constructions, preferably in the form of slots 12a, 12b, 12c, 12d and 12e, are cut into the side plate. A second pattern of locating constructions for uniquely locating vertical support 16 with respect to side plate 12 is selected, and the second plurality of locating constructions, preferably in the form of slots 12f, 12g and 12h, are also cut into the side plate.

Figure 2:
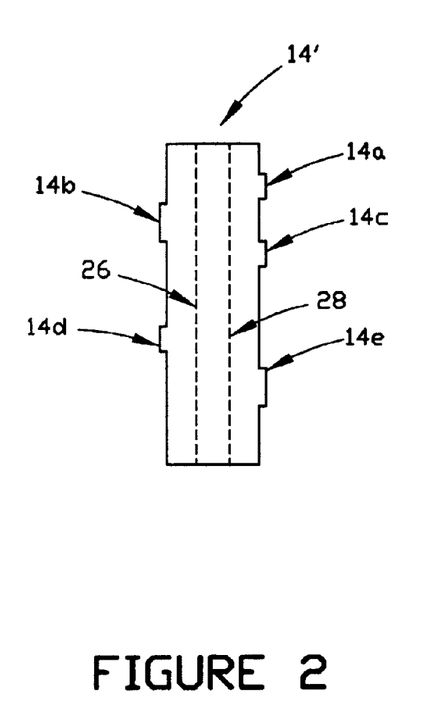
FIG. 2 is a plan view of a blank for a first vertical support of the assembly of FIG. 1.
Figure 3:
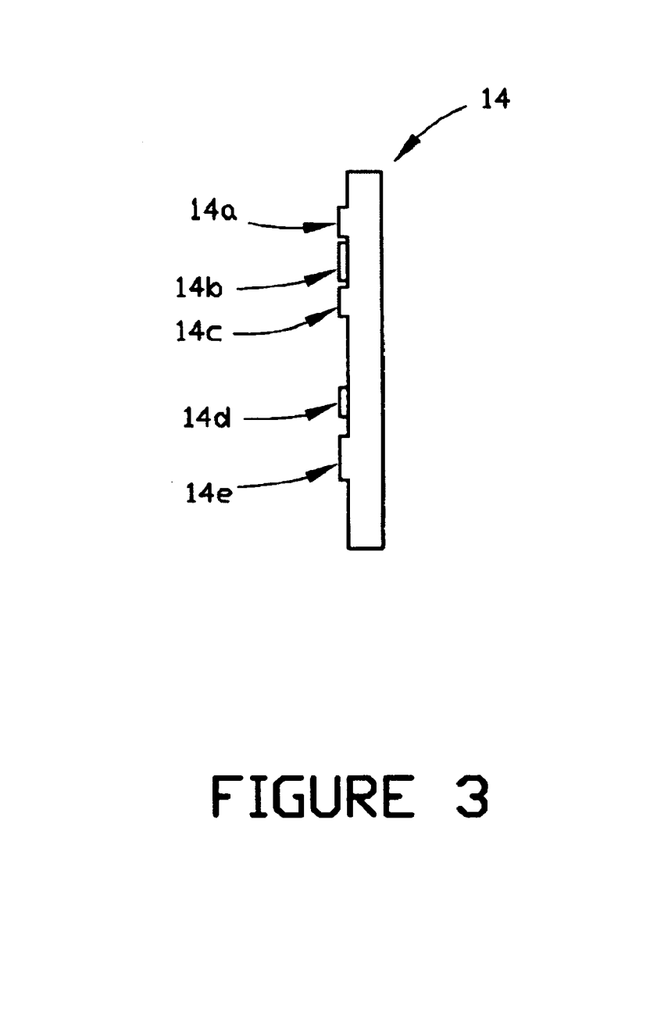
FIG. 3 is a side view of a first vertical support of the assembly of FIG. 1.
Figure 4:
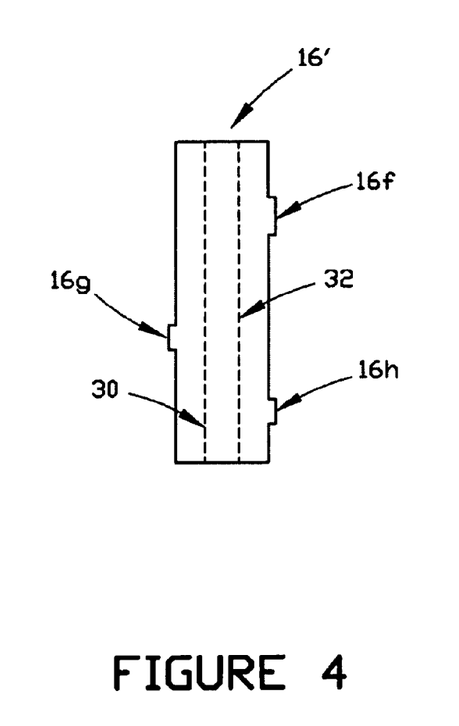
FIG. 4 is a plan view of a blank for a second vertical support of the assembly of FIG. 1.
Figure 5:
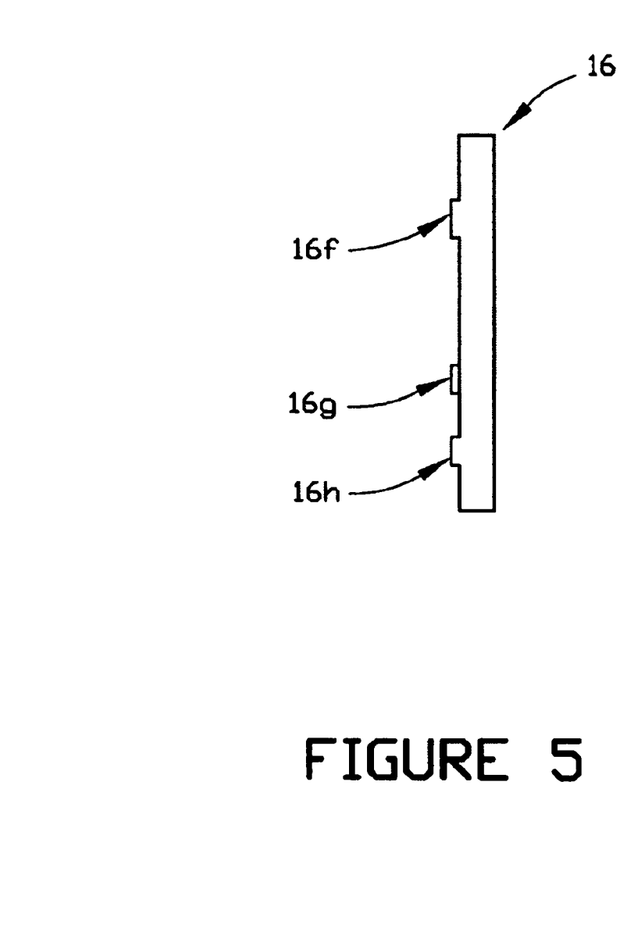
FIG. 5 is a side view of a second vertical support of the assembly of FIG. 1.

A second sheet of metal, preferably a rectangular, flat sheet of suitable thickness for the use intended, is also selected from sheet storage facility 18 and conveyed to cutting station 20 (or to another cutting station which is not illustrated in the drawings). At the cutting station, blank 14' (FIG. 2) is cut from the second sheet. As is illustrated in FIGS. 1 through 3, blank 14' includes a plurality of first mating structures, preferably in the form of tabs 14a, 14b, 14c, 14d and 14e, which are sized, shaped and spaced so as to mate with the first slots 12a, 12b, 12c, 12d and 12e in side plate 12 when blank 14' has been formed into vertical support 14. The blank is conveyed to bending station 22 and bent along bend lines 26 and 28 to form vertical support 14.

A third sheet of metal, preferably a rectangular, flat sheet of suitable thickness for the use intended, is also selected, preferably from sheet storage facility 18, and preferably conveyed to cutting station 20. At the cutting station, blank 16' (FIG. 4) is cut from the third sheet. As is illustrated in FIGS. 1 through 3, blank 16' includes a plurality of second mating structures, preferably in the form of tabs 16*f*, 16*g* and 16*h*, which are sized, shaped and spaced so as to mate with the second slots 12*f*, 12*g* and 12*h* in side plate 12 when blank 16' has been formed into vertical support 16. The blank is conveyed to bending station 22 and bent along bend lines 30 and 32 to form vertical support 16.

After side plate 12 and vertical supports 14 and 16 have been formed, they may all be conveyed to assembly and welding station 24 where the vertical supports are located with respect to the side plate by mating the tabs on the vertical supports with the corresponding slots on the side plate. As can be seen from an examination of FIGS. 1–5, slots 12*a*, 12*b*, 12*c*, 12*d* and 12*e* and tabs 14*a*, 14*b*, 14*c*, 14*d* and 14*e* are sized, shaped, located and provided in such numbers as to uniquely locate vertical support 14 with respect to side plate 12. Similarly, slots 12*f*, 12*g* and 12*h* and tabs 16*f*, 16*g* and 16*h* are sized, shaped, located and provided in such numbers as to uniquely locate vertical support 16 with respect to side plate 12. Even though vertical supports 14 and 16 are of comparable height and thickness, they may not be interchangeably located, or located in any way other than as illustrated in FIG. 1, with respect to side plate 12 because of the different numbers, sizes and locations of their locating tabs. When the vertical supports have been located with respect to the side plate, the vertical supports may be welded to the side plate to complete the body assembly.

It is preferred that the components be fabricated from sheets of metal such as steel having a thickness of one half inch or less, and that the tabs be cut to a length within the range of 50–100% of the thickness of the sheet having the slots to which the tabs are mated, so that the tabs do not extend through the sheet in which the slots are cut (with an exception that will be discussed hereinafter). It should be appreciated that the slots that are intended to mate with the tabs of a particular component need not all be parallel in the first component, although such construction is preferred. Furthermore, it should also be appreciated that the invention may be employed in the manufacture of a body assembly having more than three components. Finally, the invention may also accommodate the formation of tabs by cutting and bending them outwardly or otherwise forming them in the first component and forming corresponding slots in flat portions of the second and third components or the use of other locating constructions and mating structures, such as, for example, holes and pins.

Figure 7:
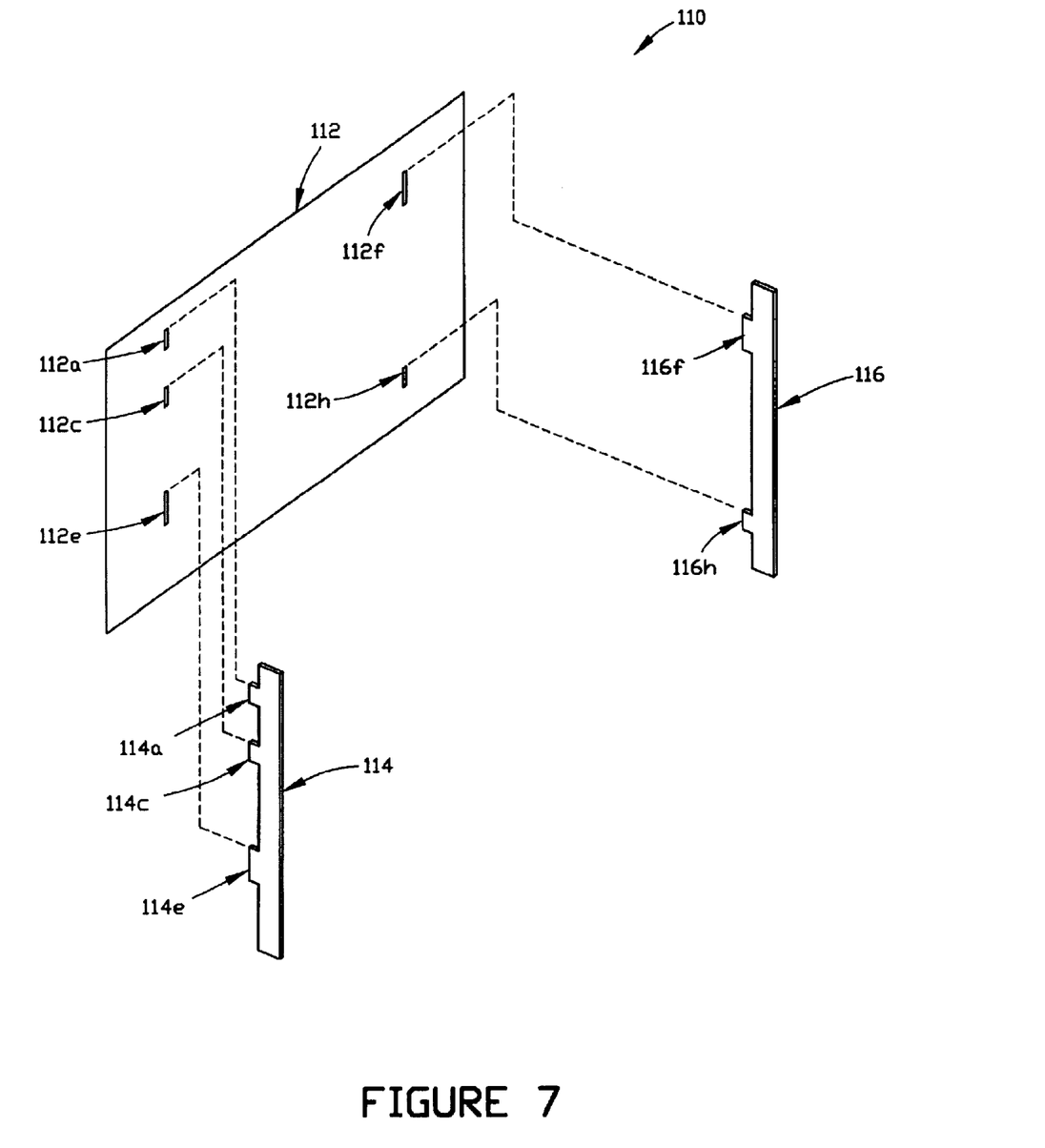
FIG. 7 is a perspective view of an exploded assembly of a portion of a hopper side panel of alternative construction to that of the embodiment of FIG. 1.

It should also be appreciated that the components to be assembled according to the invention need not all be cut from sheet metal. Thus, for example, as shown in FIG. 7, assembly 110 includes a first component comprising side plate 112, a second component comprising vertical support 114 and a third component comprising vertical support 116. A first plurality of locating constructions, preferably in the form of slots 112*a*, 112*c* and 112*e*, and a second plurality of locating constructions, preferably in the form of slots 112*f* and 112*h*, are cut or otherwise formed in the side plate. A second component in the form of vertical support 114 may be forged or otherwise formed so as to include a plurality of first mating structures, preferably in the form of tabs 114*a*, 114*c* and 114*e*, which are sized, shaped and spaced so as to mate with the first slots 112*a*, 112*c* and 12*e* in side plate 112. A third component in the form of vertical support 116 may be forged or otherwise formed so as to include a plurality of second mating structures, preferably in the form of tabs 116*f* and 116*h*, which are sized, shaped and spaced so as to mate with the second slots 112*f* and 112*h* in side plate 112. After side plate 112 and vertical supports 114 and 116 have been formed, they may all be conveyed to an assembly and welding station where the vertical supports are located with respect to the side plate by mating the tabs on the vertical supports with the corresponding slots on the side plate. As can be seen from an examination of FIG. 7, slots 112*a*, 112*c* and 112*e* and tabs 114*a*, 114*c* and 114*e* are sized, shaped and located to uniquely locate vertical support 114 with respect to side plate 112. Similarly, slots 112*f* and 112*h* and tabs 116*f* and 116*h* are sized, shaped and located so as to uniquely locate vertical support 116 with respect to side plate 112. Even though vertical supports 114 and 116 are of comparable height and thickness, they may not be interchangeably located with respect to side plate 112. When the vertical supports have been located with respect to the side plate, the vertical supports may be welded to the side plate to complete the body assembly.

Figure 8:
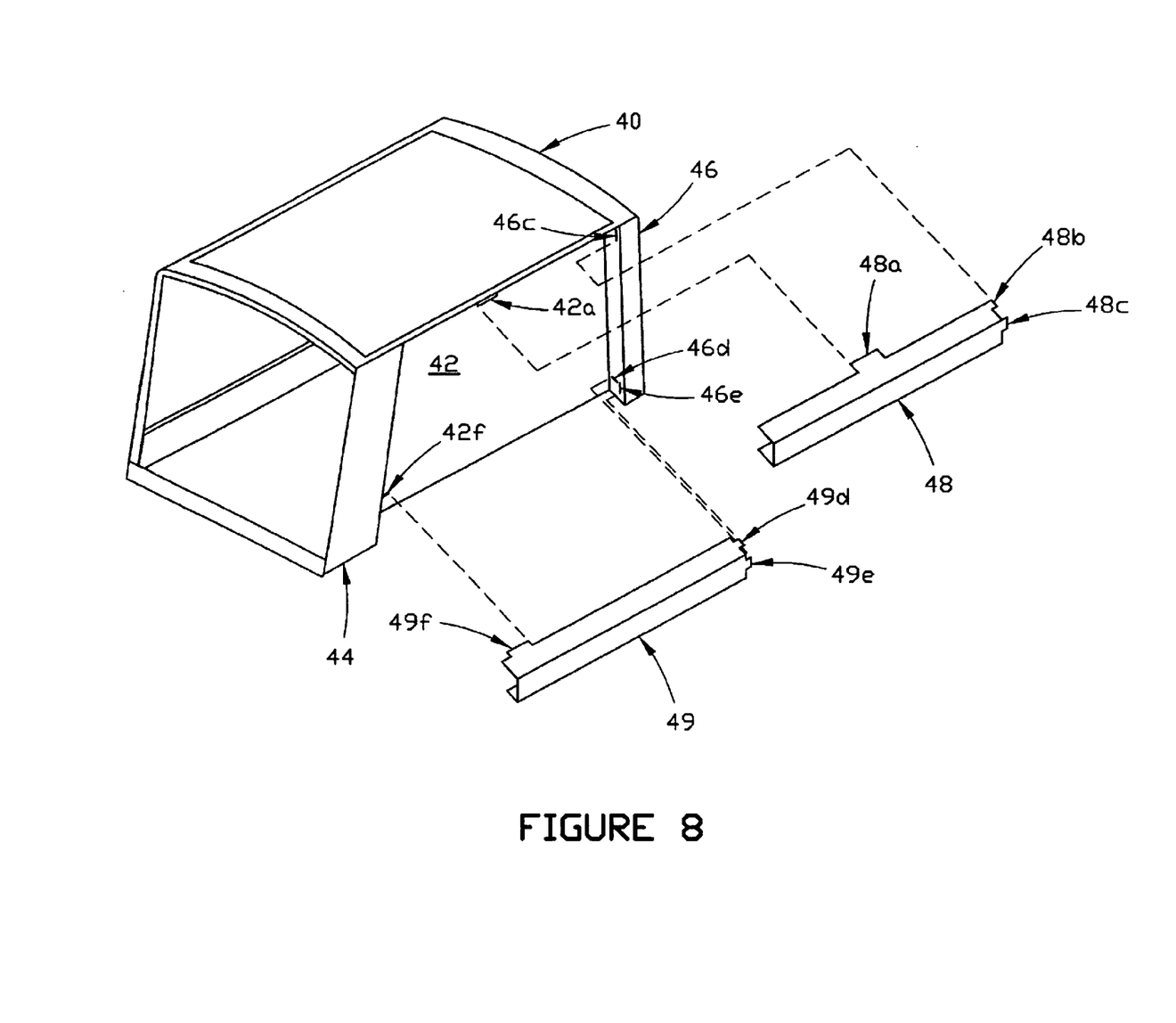
FIG. 8 is a perspective view of an exploded assembly of a portion of a storage compartment of a front loader type refuse vehicle.

FIG. 8 illustrates the assembly of a portion of a storage compartment of a front loader refuse vehicle according to a preferred embodiment of the invention. As shown therein, first component or subassembly 40 includes side plate 42, rear side panel 44 and front side panel 46. A first plurality of locating constructions, preferably in the form of slots 42*a*, 46*c* and another slot (not shown) are cut or otherwise formed in side plate 42 (slot 42*a*) and front side panel 46 (slot 46*c* and the other slot), respectively of subassembly 40. A second plurality of locating constructions, preferably in the form of slots 46*d*, 46*e* and 42*f*, are cut or otherwise formed in the front side panel (slots 46*d* and 46*e*) and side plate (slot 42*f*) of subassembly 40. A second component comprising upper support 48 and having tabs 48*a*, 48*b* and 48*c*, and a third component comprising lower support 49 and having tabs 49*d*, 49*e* and 49*f*, are formed in the manner of vertical supports 14 and 16 of assembly 10.

Subassembly 40, upper support 48 and lower support 49 may be conveyed to an assembly and welding station (not shown) where the upper and lower supports may be located with respect to the subassembly by mating the tabs on the upper and lower supports with the corresponding slots on the side plate and front side panel. As can be seen from an examination of FIG. 8, slots 42*a*, 46*c* and another slot (not shown) and tabs 48*a*, 48*b* and 48*c* are sized, shaped, located and provided in such numbers as to uniquely locate upper support 48 with respect to subassembly 40. Similarly, slots 46*d*, 46*e* and 42*f* and tabs 49*d*, 49*e* and 49*f* are sized, shaped, located and provided in such numbers as to uniquely locate lower support 49 with respect to subassembly 40. Even though upper support 48 and lower support 49 are of comparable length and thickness, they may not be interchangeably located, or located in any way other than as illustrated in FIG. 8, with respect to subassembly 40 because of the different numbers, sizes and locations of their locating tabs. When the upper and lower supports have been located with respect to the subassembly, the upper and lower supports may be welded to the subassembly to complete the body assembly.

Figure 9:
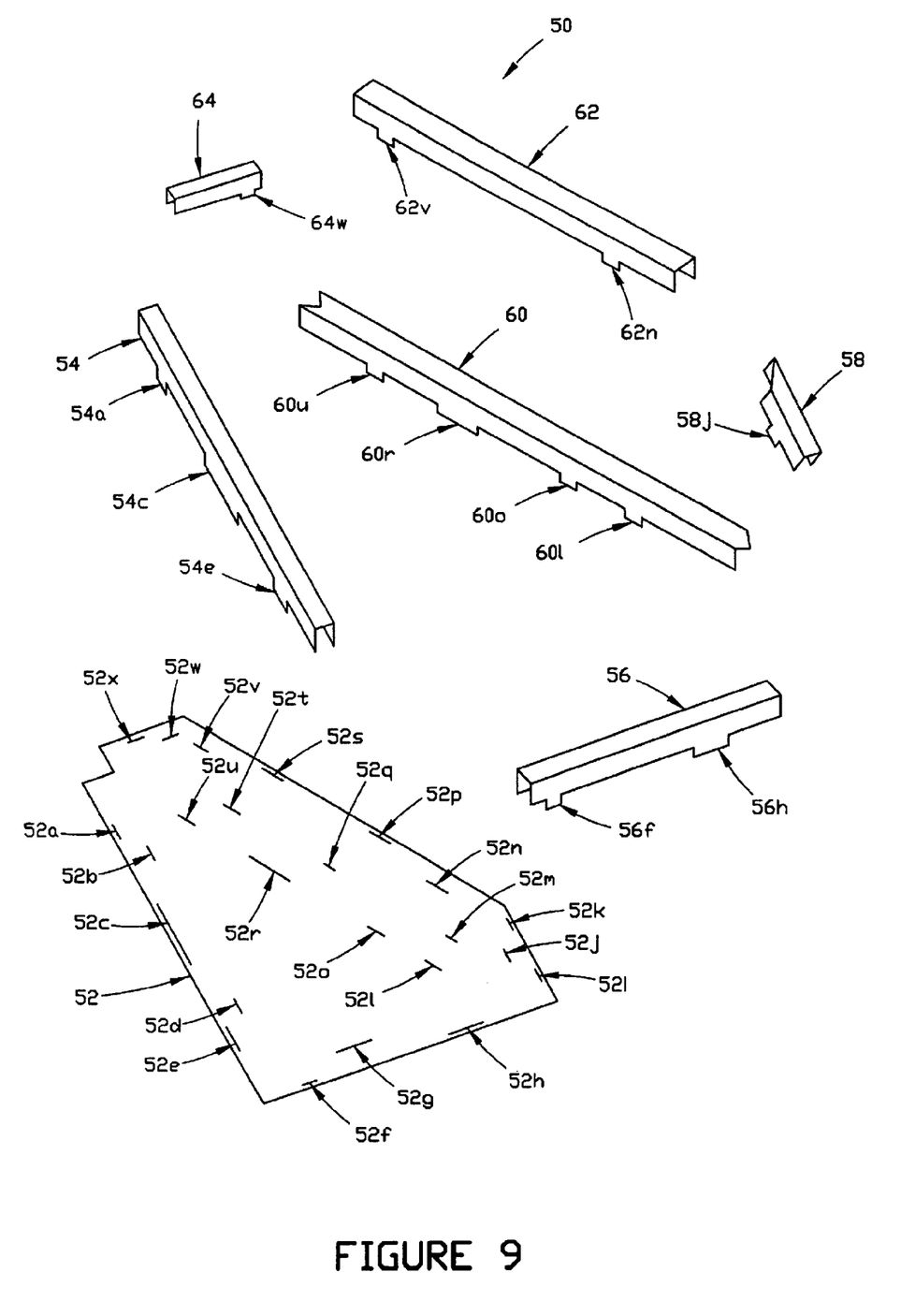
FIG. 9 is a perspective view of an exploded assembly of a portion of a tailgate side panel of a rear loader type refuse vehicle.

FIG. 9 illustrates the assembly of a portion of a tailgate side panel of a rear loader type refuse vehicle according to a preferred embodiment of the invention. As shown therein, assembly 50 includes a first component comprising side plate 52, a second component comprising support 54, a third component comprising support 56, a fourth component comprising support 58, a fifth component comprising support 60, a sixth component comprising support 62 and a seventh component comprising support 64. In the practice of the invention to manufacture this body assembly, a first sheet of metal (not shown), preferably a rectangular, flat sheet of suitable thickness for the use intended, is selected and side plate 52 is cut from the first sheet. Six patterns of locating constructions for uniquely locating each of supports 54, 56, 58, 60, 62 and 64 with respect to side plate 52 are selected and cut into the side plate. A first plurality of locating constructions, preferably in the form of slots 52a, 52b, 52c, 52d and 52e, are cut into the side plate for uniquely locating support 54 with respect to the side plate. A second plurality of locating constructions, preferably in the form of slots 52f, 52g and 52h, are also cut into the side plate for uniquely locating support 56 with respect thereto. A third plurality of locating constructions, preferably in the form of slots 52i, 52j and 52k, are cut into the side plate for uniquely locating support 58 with respect to the side plate. A fourth plurality of locating constructions, preferably in the form of slots 52l, 52m, 52o, 52q, 52r, 52t and 52u, are also cut into the side plate for uniquely locating support 60 with respect thereto. A fifth plurality of locating constructions, preferably in the form of slots 52n, 52p, 52s and 52v, are cut into the side plate for uniquely locating support 62 with respect to the side plate. A sixth plurality of locating constructions, preferably in the form of slots 52w and 52x, are also cut into the side plate for uniquely locating support 64 with respect thereto.

Additional sheets of metal (not shown) are selected, and blanks corresponding to supports 54, 56, 58, 60, 62 and 64 (each corresponding in the same way that blank 14' corresponds to support 14) are cut therefrom. The blank corresponding to support 54 (not shown) includes a plurality of first mating structures, preferably in the form of tabs 54a, 54c, 54e and two other tabs (not shown), which are sized, shaped and spaced so as to mate with slots 52a, 52c, 52e, 52b and 52d in side plate 52 when the blank is bent (in the same manner that blank 14' is bent to form support 14) to form support 54.

The blank corresponding to support 56 (not shown) includes a plurality of second mating structures, preferably in the form of tabs 56f, 56h and another tab (not shown), which are sized, shaped and spaced so as to mate with slots 52f, 52h and 52g in side plate 52 when the blank is bent to form support 56.

The blank corresponding to support 58 (not shown) includes a plurality of third mating structures, preferably in the form of tabs 58j and two other tabs (not shown), which are sized, shaped and spaced so as to mate with slots 52j, 52i and 52k in side plate 52 when the blank is bent to form support 58.

The blank corresponding to support 60 (not shown) includes a plurality of fourth mating structures, preferably in the form of tabs 60l, 60o, 60r, 60u and three other tabs (not shown), which are sized, shaped and spaced so as to mate with slots 52l, 52o, 52r, 52u, 52m, 52q and 52t in side plate 52 when the blank is bent to form support 60.

The blank corresponding to support 62 (not shown) includes a plurality of fifth mating structures, preferably in the form of tabs 62n, 62v and two other tabs (not shown), which are sized, shaped and spaced so as to mate with slots 52n, 52v, 52p and 52s in side plate 52 when the blank is bent to form support 62.

The blank corresponding to support 64 (not shown) includes a plurality of sixth mating structures, preferably in the form of tab 64w and another tab (not shown), which are sized, shaped and spaced so as to mate with slots 52w and 52x in side plate 52 when the blank is bent to form support 64.

The blank for each of supports 54, 56, 58, 60, 62 and 64 is bent to form the corresponding support in the same manner that blank 14' is bent to form support 14. After side plate 52 and supports 54, 56, 58, 60, 62 and 64 have been formed, each of the supports is located with respect to the side plate by mating the tabs on the support with the corresponding slots on the side plate. As can be seen from an examination of FIG. 9, slots 52a, 52c, 52e, 52b and 52d and tabs 54a, 54c, 4e and two other tabs (not shown) are sized, shaped, located and provided in such numbers as to uniquely locate support 54 with respect to side plate 52. Similarly, slots 52f, 52h and 52g and tabs 56f, 56h and another tab (not shown) are sized, shaped, located and provided in such numbers as to uniquely locate support 56 with respect to side plate 52. In the same manner, slots 52j, 52k and 52i and tab 58j and two other tabs (not shown) are sized, shaped, located and provided in such numbers as to uniquely locate support 58 with respect to side plate 52. Slots 52l, 52o, 52r, 52u, 52m, 52q and 52t and tabs 60l, 60o, 60r, 60u and three other tabs (not shown) are sized, shaped, located and provided in such numbers as to uniquely locate support 60 with respect to side plate 52. Slots 52n, 52v, 52p and 52s and tabs 62n, 62v and two other tabs (not shown) are sized, shaped, located and provided in such numbers as to uniquely locate support 62 with respect to side plate 52. Slots 52w and 52x and tab 64w and another tab (not shown) are sized, shaped, located and provided in such numbers as to uniquely locate support 64 with respect to side plate 52. As can be appreciated from an examination of FIG. 9, supports 54, 56, 58, 60, 62 and 64 may not be interchangeably located, or located in any way other than as illustrated in FIG. 9, with respect to side plate 52 because of the different numbers, sizes and locations of their locating tabs. When the supports have been located with respect to the side plate, the supports may be welded to the side plate to complete the body assembly.

Figures 10, 11:
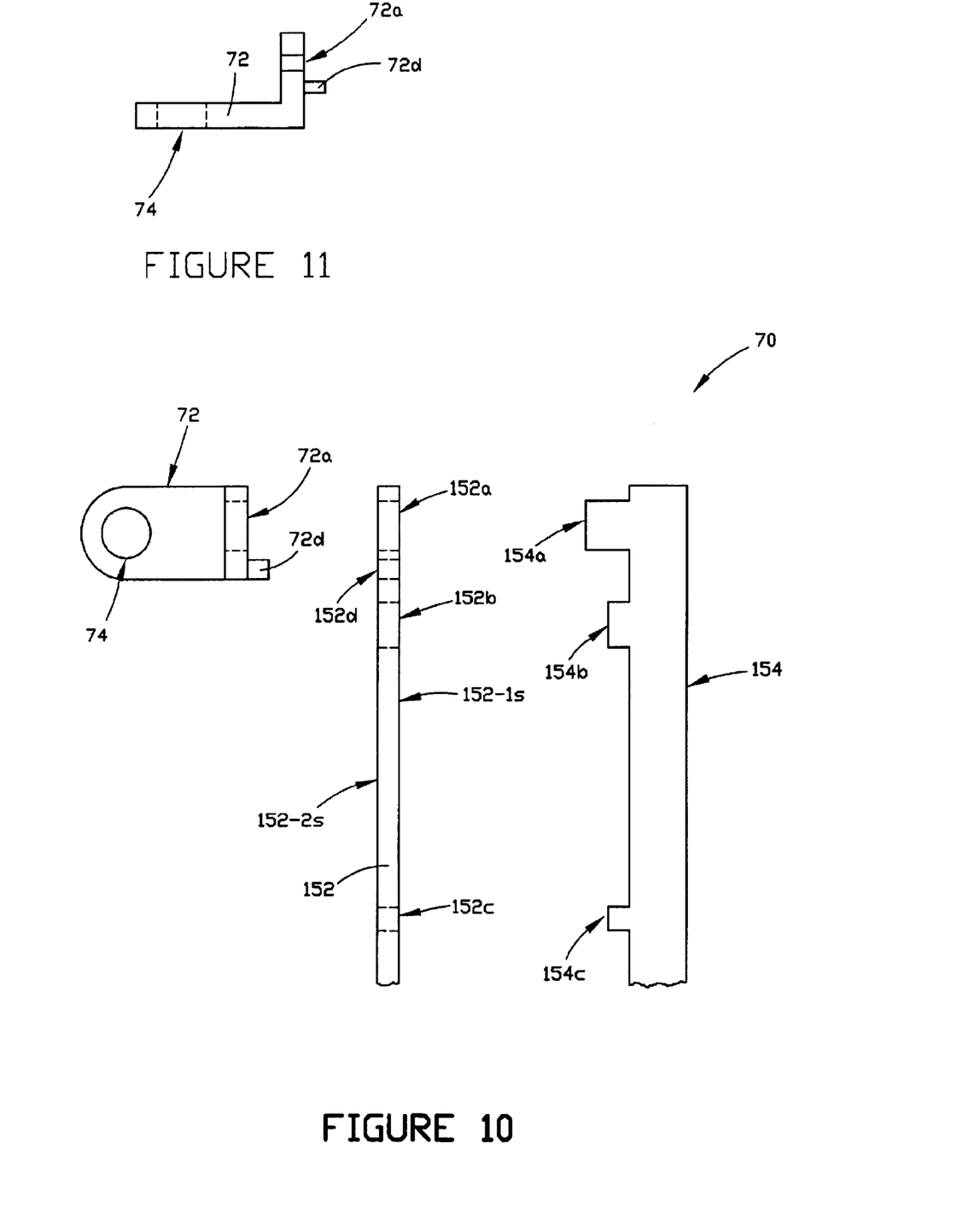
FIG. 10 is a side view of a portion of an alternative assembly of a tailgate side panel of the refuse vehicle of FIG. 9, which includes a front view of a bracket of the alternative assembly.
FIG. 11 is a side view of the bracket of the alternative assembly of FIG. 10.

FIGS. 10 and 11 illustrate a portion of an alternative assembly of a tailgate side panel of the refuse vehicle of FIG. 9. As shown therein, first component 152 of subassembly 70 is comprised of side plate 152 having a first side 152-1s and a second side 152-2s. A first plurality of locating slots 152a, 152b and 152c, and a second locating slot 152d are cut or otherwise formed in side plate 152. At least one of the first plurality of locating slots, namely slot 152a, comprises a through slot that extends through side plate 152. A second component comprising support 154 and having a first plurality of locating tabs 154a, 154b and 154c is formed in the manner of support 54 of assembly 50, except that tab 154a is a long tab having a length preferably within the range of 150–200% of the thickness of plate 152. A third component of assembly 70 comprises bracket 72, which includes slot 72a that is adapted to mate with long tab 154a on support 154 when the long tab is inserted through locating slot 152a in side plate 152. Bracket 72 also includes tab 72d that is adapted to mate with locating slot 152d in side plate 152. The bracket also includes hole 74. Support 154 is located with respect to side plate 152 (against side 152-1s) by mating tabs 154a, 154b and 154c with slots 152a, 152b and 152c respectively. Bracket 72 is located with respect to side plate 152 (against side 152-2s) and support 154 by mating slot 72a with the portion of long tab 154a that extends through slot 152a (and protrudes from side 152-2s) while mating tab 72d with slot 152d in the side plate, so as to uniquely locate the bracket with respect to side plate 152 and support 154. As can be seen from an examination of FIGS. 10 and 11, slots 152a, 152b and 152c and tabs 154a, 154b and 154c are sized, shaped, located and provided in such numbers as to uniquely locate support 154 with respect to side plate 152. Similarly, slot 72a and tabs 154a and 72d are sized, shaped, located and provided in such numbers as to uniquely locate bracket 72 with respect to side plate 152 and support 154. When the support and the bracket have been located with respect to the side plate, the support and bracket may be welded to the side plate to complete the body assembly.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A method of manufacture of a body assembly of a refuse vehicle which comprises:
   (a) selecting a first sheet of metal;
   (b) cutting a first component from the first sheet of metal;
   (c) cutting a first plurality of locating slots in the first component;
   (d) cutting a second plurality of locating slots in the first component;
   (e) forming a second component having a plurality of first mating structures in the form of a plurality of first tabs that are adapted to mate with the first plurality of slots in the first component when the second component has been formed, so as to uniquely locate the second component with respect to the first component, said first tabs having a length no greater than the thickness of the first sheet of metal;
   (f) forming a third component having a plurality of first mating structures in the form of a plurality of second tabs that are adapted to mate with the second plurality of slots in the first component when the third component has been formed, so as to uniquely locate the third component with respect to the first component, said second tabs having a length no greater than the thickness of the first sheet of metal;
   (g) locating the second component with respect to the first component only by mating the first tabs on the second component with the first plurality of slots in the first component;
   (h) locating the third component with respect to the first component only by mating the second tabs on the third component with the second plurality of slots in the first component;
   (i) welding the second component to the first component;
   (j) welding the third component to the first component.

2. The method of claim 1 which includes the following steps instead of the corresponding steps of claim 1:
   (d) forging a second component having a plurality of first mating structures in the form of a plurality of first tabs that are adapted to mate with the first plurality of slots in the first component so as to uniquely locate the second component with respect to the first component, said first tabs having a length no greater than the thickness of the first sheet of metal;
   (e) forging a third component having a plurality of second mating structures in the form of a plurality second tabs that are adapted to mate with the second plurality of slots in the first component so as to uniquely locate the third component with respect to the first component, said second tabs having a length no greater than the thickness of the first sheet of metal.

3. The method of claim 1 which includes the following steps instead of the corresponding steps of claim 1:
   (e) forming a second component having a plurality of first mating structures in the form of a plurality of first tabs that are adapted to mate with the first plurality of slots in the first component when the second component has been formed, so as to uniquely locate the second component with respect to the first component, said first tabs having a length within the range of 50–100% of the thickness of the first sheet of metal;
   (f) forming a third component having a plurality of second mating structures in the form of a plurality of second tabs that are adapted to mate with the second plurality of slots in the first component when the third component has been formed, so as to uniquely locate the third component with respect to the first component, said second tabs having a length within the range of 50–100% of the thickness of the first sheet of metal.

4. A method of manufacture of a body assembly of a refuse vehicle which comprises:
   (a) forming a first component;
   (b) cutting a first plurality of locating slots in the first component;
   (c) cutting a second locating slot in the first component;
   (d) forming a second component including a plurality of first locating tabs, at least one of which is a long tab having a length within the range of 150–200% of the thickness of the first component, which first locating tabs are adapted to mate with the first plurality of locating slots in the first component when the second component has been formed, so as to uniquely locate the second component with respect to the first component;
   (e) forming a third component having:
      (i) a tab that is adapted to mate with the second locating slot in the first component, and
      (ii) a slot which is adapted to mate with the long tab on the second component when the long tab is inserted through one of the first plurality of locating slots in the first component,
   so as to uniquely locate the third component with respect to the first and second components when the third component has been formed;
   (f) locating the second component with respect to the first component by mating the first tabs on the second component with the first plurality of slots in the first component;
   (g) locating the third component with respect to the first and second components by mating the tab on the third component with the second locating slot in the first component while mating the slot in the third component with the long tab on the second component,
   (h) welding the second component to the first component;
   (i) welding the third component to the first component.

5. A method of manufacture of a body assembly of a refuse vehicle which includes a plurality of components that are fabricated from sheets of metal, said method comprising:
   (a) selecting a first sheet of metal;
   (b) cutting a first component from the first sheet of metal;
   (c) forming a first plurality of locating constructions in the first component;

(d) forming a second plurality of locating constructions in the first component;

(e) selecting a second sheet of metal;

(f) cutting a blank for a second component from the second sheet of metal;

(g) forming in the blank for the second component a plurality of first mating structures that are adapted to mate with the first plurality of locating constructions in the first component without protruding through the first component when the blank for the second component has been formed into the second component, so as to uniquely locate the second component with respect to the first component;

(h) bending the blank for the second component to form the second component so that a plurality of sides of said second component will contact the first component when said first mating structures are mated with the first plurality of locating constructions in the first component;

(i) selecting a third sheet of metal;

(j) cutting a blank for a third component from the third sheet of metal;

(k) forming in the blank for the third component a plurality of second mating structures that are adapted to mate with the second plurality of locating constructions in the first component without protruding through the first component when the blank for the third component has been formed into the third component, so as to uniquely locate the third component with respect to the first component;

(l) bending the blank for the third component to form the third component so that a plurality of sides of said third component will contact the first component when said second mating structure are mated with the second plurality of locating constructions in the first component;

(m) locating the second component with respect to the first component by mating the first mating structures on the second component with the first plurality of locating constructions in the first component;

(n) locating the third component with respect to the first component by mating the second mating structures on the third component with the second plurality of locating constructions in the first component;

(o) welding the second component to the first component;

(p) welding the third component to the first component.

6. The method of claim 5 which includes:

(1) the following steps instead of step (c) of claim 5:
(c1) selecting a first pattern of locating constructions for uniquely locating the second component with respect to the first component;
(c2) forming a first plurality of locating constructions in the first component according to the first pattern;

(2) the following steps instead of step (d) of claim 5:
(d1) selecting a second pattern of locating constructions for uniquely locating the third component with respect to the first component;
(d2) forming a second plurality of locating constructions in the first component according to the second pattern.

7. The method of claim 5 which includes the following steps instead of the corresponding steps of claim 5:

(c) forming a first plurality of locating constructions in the first component by cutting a first plurality of slots therein;

(d) forming a second plurality of locating constructions in the first component by cutting a second plurality of slots therein;

(g) forming in the blank for the second component a plurality of first mating structures in the form of a plurality of first tabs that are adapted to mate with the first plurality of slots in the first component when the blank for the second component has been formed into the second component, said first tabs having a length no greater than the thickness of the first sheet of metal, so as to uniquely locate the second component with respect to the first component;

(k) forming in the blank for the third component a plurality of second mating structures in the form of a plurality of second tabs that are adapted to mate with the second plurality of slots in the first component when the blank for the third component has been formed into the third component, said second tabs having a length no greater than the thickness of the first sheet of metal, so as to uniquely locate the third component with respect to the first component;

(m) locating the second component with respect to the first component by mating the first tabs on the second component with the first plurality of slots in the first component;

(n) locating the third component with respect to the first component by mating the second tabs on the third component with the second plurality of slots in the first component.

8. A method of manufacture of a body assembly of a refuse vehicle which includes a plurality of components that a fabricated from sheets of metal, said method comprising:

(a) selecting first sheet of metal;

(b) cutting first component from the first sheet of metal;

(c) forming a first locating construction in the first component;

(d) forming a second locating construction in the first component;

(e) selecting a second sheet of metal;

(f) cutting a blank for second component from the second sheet of metal;

(g1) forming in the blank for the second component a first mating structure that is adapted to mate with the first locating construction in the first component when the blank for the second component has been formed into the second component, so as to uniquely locate the second component with respect to the first component;

(g2) forming a third locating construction in the blank for the second component;

(h) bending the blank for the second component to form the second component;

(i) selecting a third sheet of metal;

(j) cutting A blank for A third component from the third sheet of metal;

(k1) forming in the blank for the third component a first mating structure that is adapted to mate with the second locating construction in the first component, so as to uniquely locate the third component with respect to the first component;

(k2) forming in the blank for the third component a second mating structure that is adapted to mate with the third locating construction on the second component when the blank for the third component has been formed into the third component, so as to uniquely locate the third component with respect to the second component;

(l) bending the blank for the third component to form the third component;

(m) locating the second component with respect to the first component by mating the first mating structure on the second component with the first locating construction in the first component;

(n) locating the third component with respect to the second component by mating the second mating structure on the third component with the third locating construction in the second component;

(o) welding the second component to the first component;

(p) welding the third component to the first component.

9. A method of manufacture of a body assembly of a refuse vehicle which includes a plurality of components that are fabricated from sheets of metal, said method comprising:

(a) selecting a first sheet of metal;

(b) conveying said first sheet of metal to a cutting station;

(c) cutting a first component from the first sheet of metal;

(d) cutting a first plurality of locating slots in the first component;

(e) cutting a second plurality of locating slots in the first component;

(f) conveying the first component to a welding station;

(g) selecting a second sheet of metal;

(h) conveying said second sheet of metal to the cutting station;

(i) cutting a blank for a second component from the second sheet of metal, said blank for said second component including a plurality of first locating tabs that are adapted to mate with the first plurality of locating slots in the first component when the blank for the second component has been formed into the second component, so as to uniquely locate the second component with respect to the first component;

(j) conveying the blank for the second component to a bending station;

(k) bending the blank for the second component to form the second component;

(l) conveying the second component to the welding station;

(m) selecting a third sheet of metal;

(n) conveying said third sheet of metal to the cutting station;

(o) cutting a blank for a third component from the third sheet of metal, said blank for said third component including a second plurality of locating tabs that are adapted to mate with the second plurality of locating slots in the first component when the blank for the third component has been formed into the third component, so as to uniquely locate the third component with respect to the first component;

(p) conveying the blank for the third component to the bending station;

(q) bending the blank for the third component to form the third component;

(r) conveying the third component to the welding station;

(s) locating the second component with respect to the first component by mating the first plurality of locating tabs on the second component with the first plurality of locating slots in the first component;

(t) locating the third component with respect to the first component by mating the second plurality of locating tabs on the third component with the second plurality of locating slots in the first component;

(u) welding the second component to the first component;

(v) welding the third component to the first component.

10. The method of claim 9 which includes:

(1) the following steps instead of step (d) of claim 9:
  (d1) selecting a first pattern of slots for uniquely locating the second component with respect to the first component;
  (d2) cutting a first plurality of locating slots in the first component according to the first pattern;

(2) the following steps instead of step (e) of claim 9:
  (e1) selecting a second pattern of slots for uniquely locating the third component with respect to the first component;
  (e2) cutting a second plurality of locating slots in the first component according to the second pattern.

11. The method of claim 9 which includes:

(1) the following step instead of step (i) of claim 9:
  (i) cutting a blank for a second component from the second sheet of metal, said blank for said second component including a plurality of first locating tabs having a length within the range of 50–100% of the thickness of the first sheet of metal, which tabs are adapted to mate with the first plurality of locating slots in the first component when the blank for the second component has been formed into the second component, so as to uniquely locate the second component with respect to the first component;

(2) the following step instead of step (o) of claim 9:
  (o) cutting a blank for a third component from the third sheet of metal, said blank for said third component including a second plurality of locating tabs having a length within the range of 50–100% of the thickness of the first sheet of metal, which tabs are adapted to mate with the second plurality of locating slots in the first component when the blank for the third component has been formed into the third component, so as to uniquely locate the third component with respect to the first component.

12. The method of claim 9 which includes:

(1) the following step instead of step (e) of claim 9:
  (e) cutting a second locating slot in the first component;

(2) the following step instead of step (i) of claim 9:
  (i) cutting a blank for a second component from the second sheet of metal, said blank for said second component including a plurality of first locating tabs, at least one of which is a long tab having a length within the range of 150–200% of the thickness of the first sheet of metal, which first locating tabs are adapted to mate with the first plurality of locating slots in the first component when the blank for the second component has been formed into the second component, so as to uniquely locate the second component with respect to the first component;

(3) the following step instead of step (o) of claim 9:
  (o) cutting a blank for a third component from the third sheet of metal, said blank for said third component including a first tab that is adapted to mate with the second locating slot in the first component and a first slot which is adapted to mate with the long tab on the second component when the blank for the third component has been formed into the third component, so as to uniquely locate the third component with respect to the first and second components, (4) the following step instead of step (t) of claim 9:
  (t) locating the third component with respect to the first and second components by mating the first tab on the third component with the second locating slot in the first component while mating the first slot in the third component with the long tab on the second component.

13. The method of claim 9 which includes:
(1) the following step instead of step (c) of claim 9:
   (c) cutting a first component from the first sheet of metal, said first component having a first side and a second side;
(2) the following step instead of step (d) of claim 9:
   (d) cutting a first plurality of locating slots in the first side of the first component, at least one of which slots comprises a through slot that extends through the first component;
(3) the following step instead of step (e) of claim 9:
   (e) cutting a second locating slot in the second side of the first component;
(4) the following step instead of step (i) of claim 9:
   (i) cutting a blank for a second component from the second sheet of metal, said blank for said second component including a plurality of first locating tabs, at least one of which is a long tab having a length within the range of 150–200% of the thickness of the first sheet of metal, which first locating tabs are adapted to mate with the first plurality of locating slots in the first side of the first component when the blank for the second component has been formed into the second component with the long tab extending through the through slot, so as to uniquely locate the second component with respect to the first component;
(5) the following step instead of step (o) of claim 9:
   (o) cutting a blank for a third component from the third sheet of metal, said blank for said third component including a first tab that is adapted to mate with the second locating slot in the second side of the first component and a first slot which is adapted to mate with the long tab on the second component that extends through the through slot in the first component when the blank for the third component has been formed into the third component, so as to uniquely locate the third component with respect to the first and second components;
(6) the following step instead of step (s) of claim 9:
   (s) locating the second component with respect to the first component by mating the first plurality of locating tabs on the second component with the first plurality of locating slots in the first side of the first component;
(7) the following step instead of step (t) of claim 9:
   (t) locating the third component with respect to the first and second components by mating the first tab on the third component with the second locating slot in the second side of the first component while mating the first slot in the third component with the long tab on the second component that extends through the through slot in the first component;
(8) the following step instead of step (u) of claim 9:
   (u) welding the second component to the first side of the first component;
(9) the following step instead of step (v) of claim 9:
   (v) welding the third component to the second side of the first component.

* * * * *